Jan. 28, 1958 H. C. HILL 2,821,067
COMBUSTION CHAMBER CONSTRUCTION IN A GAS TURBINE ENGINE
Filed May 28, 1956
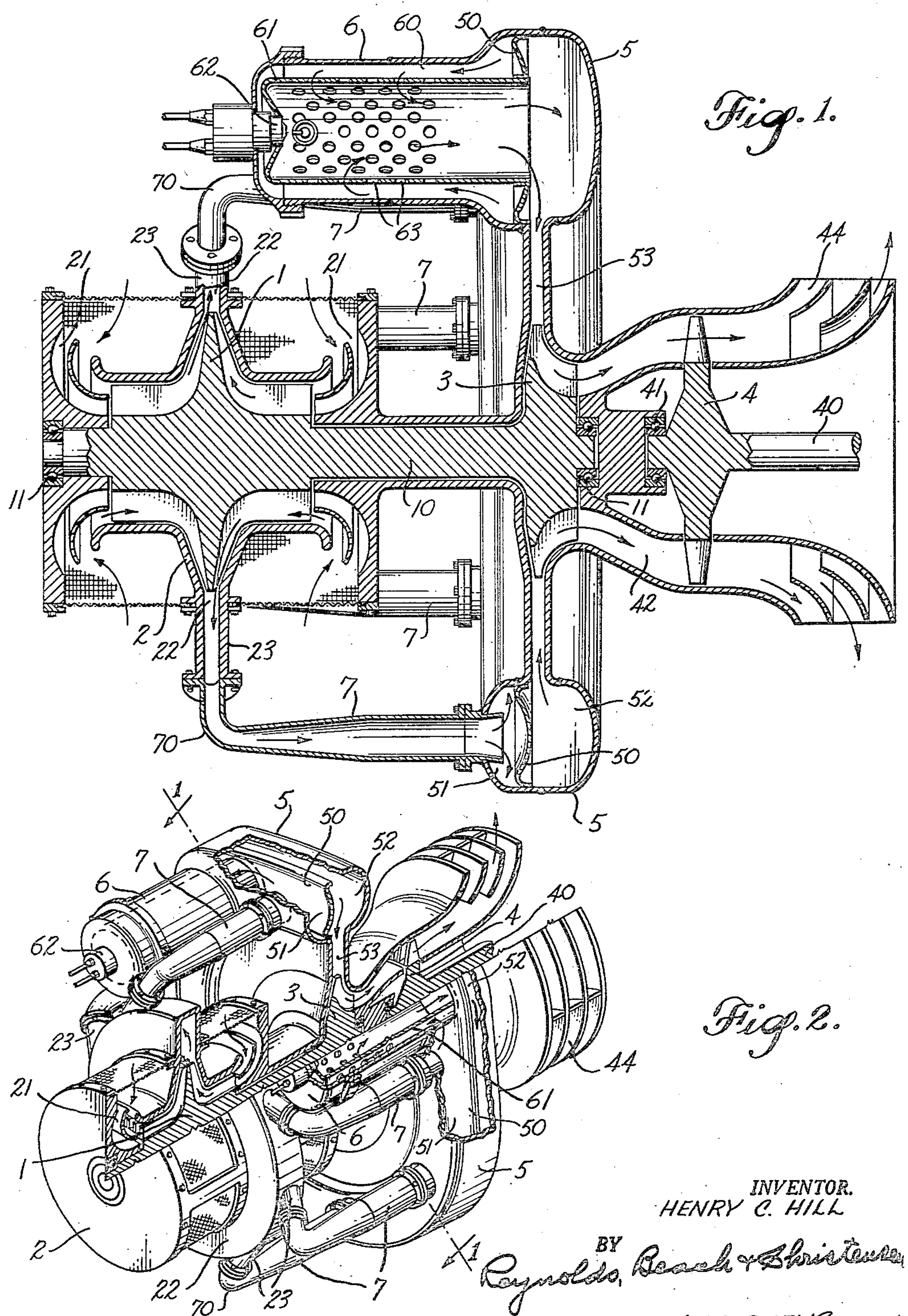
INVENTOR.
HENRY C. HILL
BY Reynolds, Beach & Christensen
ATTORNEYS United States Patent Office 2,821,067

Patented Jan. 28, 1958

2,821,067

COMBUSTION CHAMBER CONSTRUCTION IN A GAS TURBINE ENGINE

Henry C. Hill, Seattle, Wash., assignor to Boeing Airplane Company, Seattle, Wash., a corporation of Delaware Application May 28, 1956, Serial No. 587,614

4 Claims. (Cl. 60—39.75)

This invention relates to smaller gas turbine engines of the type such as are used for propelling marine vessels, automotive trucks, etc., and which differ from the larger gas turbine engines which are used for aircraft propulsion in that, among other distinctions, the smaller engines utilize a centrifugal compressor, axially spaced from the gas turbine, the gas turbine being coupled to the compressor to drive the latter, rather than an axial-flow compressor.

The centrifugal compressor used in the smaller engines described above has advantages of simplicity, ruggedness and low cost, for such smaller gas turbine engines, as compared with the axial flow compressors. This smaller type of engine, with the centrifugal compressor, has certain drawbacks, however, among them, a relatively large diameter for a given air flow capacity, and relatively lower compression efficiencies than have been obtained heretofore with axial compressors in the larger engines. Moreover, such smaller gas turbine engines have been found in the past to present certain servicing problems, owing to the fact that the combustion chambers have in effect constituted a structural link between the outlets of the compressor and the inlet to the nozzle box which supplies hot gas to the turbines. It has been difficult to get at the combustion chamber, the burner, etc. for servicing, considering the fact that not only was the combustion chamber a structural link between the two parts mentioned, but it was subject to a wide range of temperatures, and consequently there had to be allowance for thermal expansion and contraction, notwithstanding the structural link which the combustion chambers afforded.

The present invention is aimed at improving the overall efficiency of such gas turbines by raising the pressure ratio and the efficiency of the centrifugal compressors, in order to reduce the fuel consumption of such small gas turbines to values within the range obtained by the large gas turbines with axial compressors, and also to values within a range competitive with piston engines. In addition, by the present invention, the fuel efficiency of the turbine is further raised by a heat exchange arrangement whereby the air, after being compressed, receives heat from the hot gases of combustion, and the latter are in turn cooled down.

In addition, by the design of the present engine, dumping losses, where high velocity vaned passages exit into a larger volume collector, are eliminated by the employment of a series of diffuser pipes of particular proportions in size, and arranged in a particular manner, as between the compressor outlets and a collector chamber which feeds to the combustion chamber.

The engine is improved also in its compactness by the present invention, particularly in the axial direction, and its design is otherwise simplified.

The present invention will be better understood from the following specification taken in connection with the accompanying drawing, which shows in diagrammatic fashion the principles of the invention, and those features which make up the novelty of this invention will be defined in the accompanying claims.

Figure 1 is, in general, an axial sectional view, taken substantially along the plane indicated by the line 1—1 in Figure 2, illustrating in simplified form the principles of a gas turbine engine constructed according to this invention.

Figure 2 is an isometric view, partly in elevation and partly broken away and shown in axial section.

It will be appreciated that many details are omitted or shown conventionally in the drawings, and that the drawings as a whole are largely diagrammatic in character, to illustrate the principles of the invention, but do not necessarily show a practical construction in all details. Elements such as reduction gearing, bearings, and the like have been omitted, or shown in greatly simplified form, so that the features of novelty will be more clearly apparent.

A centrifugal compressor rotor is represented at 1, supported upon a shaft 10 carried in bearings 11 within a housing 2. The housing is provided with dual annular inlets 21 to the compressor, and completely or interruptedly annular outwardly directed outlet passages 22 lead from the compressor, and have a small number of outlet ports 23 for exit of compressed air.

Axially spaced from the compressor, but coupled thereto, as for instance by being carried upon the same shaft 10, is a primary gas turbine 3. The manner in which air from the compressor is led to a combustion chamber and hot gases from the combustion chamber are led to the turbine 3 constitutes in large part the novelty of the present invention, and will be described in detail shortly. To complete the description of the turbine engine, it may be noted that a secondary gas turbine 4, mounted upon a shaft 40 carried in bearings 41 receives hot gases by way of the passages 42 after the gases have passed through and performed work upon the primary gas turbine wheel 3, and these gases finally exit at 44. The shaft 40 is employed in delivering usable power.

A hollow torus 5 surrounds the gas tubine 3. Internally this torus is divided by a wall 50, which is oriented generally perpendicularly to the axis of the torus and of the shaft, to define within the torus an air collector chamber 51 and a nozzle box 52 for the reception of the hot gases from a combustion chamber or chambers, yet to be described. It will be noted that the compressed air contacts one surface of the dividing wall 50, and the hot gases of combustion contact the opposite surface of that same wall, hence there is an excellent opportunity for heat exchange between the two.

Usually there will be one or more combustion chambers, each consisting of an outer wall 6 of more or less cylindrical form, which is directed preferably in the axial direction, and is mounted at one end only, directly upon the torus 5, and projects from the torus in the axial direction toward the outlets of the compressor 1. This end of the outer wall 6, adjacent the compressor outlet, is left free, but its supported end opens freely to the interior of the collector chamber 51. Within the exterior wall 6, and more or less coaxial therewith, is an inner shell 61, which is perforated and spaced from the outer wall 6 at all points to leave an air chamber 60 between them, which air chamber is, of course, in free communication with the collector chamber 51. The interior of the inner shell 61 constitutes the combustion chamber proper, and this is supported at both ends. At the end corresponding to the supported end of the outer wall 6, the support for the inner shell 61 is in the dividing wall 50, wherefore this end of the inner shell 61 opens freely through the wall 50 into the nozzle box 52. The distant end of the inner shell 61 is supported on the burner nozzle 62 which admits thereto and supplies the fuel for admixture with the air admitted through the perforations 63, and for combustion within the inner shell 61.

The construction of the torus 5 is such as to provide either a continuous annular passage 53 for the hot gases, and to lead them to the turbine 3, or there may be separate passages, and if the passages are annular and uninterrupted, they may be divided with diffuser vanes, but these have been omitted as the detail in this respect constitutes no part of the present invention.

Air for combustion is conveyed from the outlet ports 23 of the compressor 1 to the collector chamber 51 by means of a series of air diffuser pipes 7. These pipes are all of like size and shape (which simplifies the problem of spare parts), and while they extend generally in the axial direction, they are elbowed at 70 for connection to the outlet ports 23. These air diffuser pipes, being relatively few in number, are made fairly small in diameter, and of appreciable length, expanding quite gradually, in order to avoid dumping losses, mentioned above. Their length is preferably five or more times the greatest diameter of the air diffuser pipe. Such air diffuser pipes discharge directly into the torus, that is into the collector chamber 51 thereof, at the side nearer the air compressor.

The turbine wheel 3 drives the compressor 1 in the customary manner, and air admitted at 21 is compressed and centrifugally expelled through the ports 23, and into the individual air diffuser pipes 7, whence it is conveyed with a minimum of expansion to the collector chamber 51, and from the latter it is admitted to the combustion chamber within the inner shell 61, and being mixed with the fuel, burns there, and exits as hot gases of combustion directly into the nozzle box 52 at the opposite side of the dividing wall 50. It exits from the nozzle box through the passages 53 to impinge upon the blades of the turbine at 3, and thence exits by way of 42 and past the turbine 4, and out at 44.

The arrangement described provides a sufficient length of diffuser pipe to reduce dumping losses, yet does not increase the overall length of the engine, nor particularly its diameter. The engine length is determined rather by the space required for the double-inlet compressor, the radial turbine, and the connecting shaft. The entire arrangement is simple and compact, allowing the connecting of the burners directly and simultaneously, both to the air collector chamber 51 and to the nozzle box 52. Notwithstanding this, the combustion chamber is left wholly free, at one end at least, and the burner, admitting to this end, is readily accessible. Since the combustion chamber does not constitute a connection between a collector ring and a nozzle box, no problems of thermal expansion or undue stress are entailed by the free support of the combustion chamber.

All diffuser pipes can be identical, which simplifies the design and servicing of the engine, and the maintenance of spare parts.

It will be particularly noted that cooling is provided for the nozzle box at 50, eliminating undesirable heating of the compressor inlet air from the hot nozzle box. No loss will arise due to absorption of nozzle box heat by air passing through the air collector chamber 51. Possibly there will be a slight gain in efficiency, since this ordinarily wasted heat will increase the energy in the air prior to combustion. This air, it is noted, is already compressed, for whereas heat added to the air before compression causes loss of compression efficiency, heat added after compression reduces the amount of fuel required, and improves efficiency.

I claim as my invention:

1. In a gas turbine engine, in combination with a centrifugal compressor and an axially spaced gas turbine coupled thereto, and with a housing for the compressor having outlet ports distributed about the compressor; a hollow torus encircling the gas turbine, a wall dividing said torus generally perpendicularly to its axis into a collector chamber and a nozzle box, means defining nozzle passages leading from the nozzle box to the gas turbine, combustion chambers each comprising an outer wall opening freely at one end only, to the collector chamber, and a generally coaxial perforated inner shell within said outer wall and opening freely at one end only, to the nozzle box, a burner admitting to the interior of each inner shell, at the end thereof distant from the nozzle box, and means defining circumferentially distributed air passages leading from the outlet ports from the compressor in a generally axial direction to said collector chamber.

2. In a gas turbine engine, in combination with a centrifugal compressor and an axially spaced gas turbine coupled thereto, and with a housing for the compressor having outlet ports distributed about the compressor; a hollow torus encircling the gas turbine, a wall dividing said torus generally perpendicularly to its axis into a collector chamber and a nozzle box, means defining nozzle passages leading from the nozzle box to the gas turbine, a plurality of air diffuser pipes each leading in a generally axial direction from a compressor outlet port to the interior of said collector chamber, combustion chambers each comprising an outer wall separate from the diffuser pipes, supported at one end only, from the torus, and extending thence in a generally axial direction, and opening freely into the collector chamber, and a generally coaxial perforated inner shell supported at one end from said dividing wall, and opening freely into the nozzle box, and a burner admitting to the interior of said inner shell, at the end thereof distant from the nozzle box.

3. In a gas turbine engine, in combination with a centrifugal compressor and an axially spaced gas turbine coupled thereto, and with a housing for the compressor formed with angularly spaced outlet ports distributed about and leading from the compressor; a hollow torus encircling the gas turbine, a wall dividing said torus generally perpendicularly to its axis into a collector chamber at the side nearer the compressor, and a nozzle box at the opposite side, means defining gas passages leading from the nozzle box inwardly to the turbine, a plurality of elbowed air diffuser pipes, one for each compressor outlet port, extending first outwardly therefrom and then generally in the axial direction, and connected for discharge into said collector chamber, combustion chambers supported upon said torus and extending generally in the axial direction, each including a perforated inner shell dividing the inner combustion space from a surrounding air supply chamber, said air supply chamber being in free communication at one end with the collector chamber, and the inner combustion space being in free communication at the same end with the nozzle box, and a burner admitting to the interior of said combustion space.

4. The combination of claim 3, wherein the air diffuser pipes are gradually enlarged in internal diameter from the compressor outlet port to the discharge end at the collector chamber, and are of a length at least five times their maximum diameter.

References Cited in the file of this patent

UNITED STATES PATENTS

| | | |
|---|---|---|
| 667,744 | Stolze | Feb. 12, 1901 |
| 2,748,568 | Budworth | June 5, 1956 |